Patented Mar. 10, 1925.

1,528,759

UNITED STATES PATENT OFFICE.

BERNARD J. FALLON, OF SUMMIT, NEW JERSEY; JOHN F. FALLON, ADMINISTRATOR OF SAID BERNARD J. FALLON, DECEASED.

POROUS CONCRETE AGGREGATE.

No Drawing.          Application filed October 30, 1919.    Serial No. 334,601.

*To all whom it may concern:*

Be it known that I, BERNARD J. FALLON, a citizen of the United States, residing at Summit, in the county of Union and State of New Jersey, have invented a certain new and useful Improvement in Porous Concrete Aggregate, of which the following is a specification.

This invention relates to a process for producing a light-weight porous material suitable for mixing with cement to form an improved concrete.

The object of the invention is to provide a process for converting clays or other argillaceous material into a light-weight, porous and vitreous solid possessed of a high degree of mechanical strength and which, by reason of these characteristics, forms a material particularly adapted for use as an aggregate in the formation of concrete. It has been found that a concrete having as an ingredient a porous solid of the type described, instead of the dense and unporous broken stone usually employed, forms an excellent material for use in situations where great strength and at the same time light weight is desired, as for instance, in the construction of concrete ships, freight cars, buildings and the like.

An important feature of the invention consists in carrying out an essential part of the operation of firing the clay in reducing or deoxidizing atmosphere, produced by cutting down the supply of air and passing steam through the bed of fuel into the kiln and into contact with the clay. Another feature of the invention preferably consists in admitting air or oxygen to the kiln when the deoxidizing action thereon has reached the desired extent to thereby bring about through the combustion and expansion of the oxygen in the entering gases with the oxygen-deficient gases impermeating the clay, a swelling or increase in the volume of the clay, so as to change it from a relatively dense and compact, to a spongy and porous condition.

In carrying out the invention a kiln is charged with bricks or other suitable masses of clay and the firing is started and continued in the usual way until a uniform and sufficient temperature in the entire mass has been reached and the moisture content has been driven off. I have found that a temperature of approximately 800 degrees F. is sufficient for the purpose with many clays. At this stage in the operation the dampers of the kiln are closed as far as possible short of interrupting the firing operations and all other openings where air might enter are closed, whereupon steam is let in beneath the bed of coals and through which it passes before entering the kiln and encountering the mass of clay undergoing firing. It will, of course, be recognized that producer gas mixed with water gas is thus formed by the production of carbon dioxide at the first contact of air with the bed of coals and the reduction of the dioxide to carbon monoxide as it passes through the body of coals, and by the production of carbon monoxide and free hydrogen from the decomposition of the steam. It will be seen that the impermeation of the hot mass of clay with the oxygen-deficient carbon monoxide and hydrogen will gradually produce a reducing action on the solid oxygen compounds present in the clay. This is particularly manifested in the case of clay containing iron by the reduction of the red and brown ferric compounds to the ferrous compounds which are characterized by a blue or black color. When this stage in the operation is completed and the temperature of the mass has increased to, for example, 1800 degrees F., I again cause air or oxygen to be admitted to the kiln whereupon the structure of the clay undergoes an important change in its physical and mechanical structure, in that it swells or increases in volume and becomes porous and spongy to such an extent that it is extremely light in weight as compared with the original clay. At the same time an intense heat is generated by the chemical reaction between the oxygen freshly supplied and the oxygen-deficient gases present in the mass at the end of the reducing action, so that the spongy mass is converted into a vitreous condition.

I believe that the porous effect in the mass is produced by the expansion of the gases which is probably due in part at least, to the heat of the chemical union, or combination of the oxygen with the oxygen-deficient gases such as carbon monoxide and hydrogen that have been thoroughly incorporated in the mass of material during the time, several hours, in extent, that the reducing action has been taking place. In setting forth this theory I am merely stating what appears, from observations made in the course of a long experience in the art of brick making, to be what takes place when the oxygen is admitted to the highly heated mass within the kiln.

In reference to my use of water gas, I am aware that steam has heretofore been used for various purposes in firing bricks, but so far as I am informed the introduction of steam to the kilns has invariably been accompanied by a sufficient mixture of oxygen to bring about perfect combustion, so that no reducing action, such as I have described, can take place. By bringing about the reducing action I succeed in producing, as has already been indicated, ferrous rather than ferric compounds of the iron constituents present in the particular clays referred to and thus secure a condition of the material that is best adapted under the further actions described to produce the porous light-weight and exceedingly strong material that represents the final product. This material is particularly well adapted for use in concrete work particularly where lightness as well as strength is sought, as in the building of ships, freight cars, buildings and the like, and is obviously equally well adapted for use in any situation where a material of this general nature may be used.

What I claim is:

1. The process of forming a clay product which consists in firing a mass of clay in a kiln until a uniform temperature has been reached, then in reducing the supply of air and passing steam through the bed of burning fuel into the clay to produce a reducing action thereon, and then in supplying oxygen to the clay to cause the mass to expand and thereby produce a porous material.

2. The process of forming a clay product which consists in firing a mass of clay in a kiln until a temperature of approximately 800° F. has been reached, then in reducing the supply of air and passing steam through the bed of burning fuel into the clay to produce a reducing action thereon.

3. The process of forming a clay product which consists in firing a mass of clay in a kiln until a temperature of approximately 800° F. has been reached, then in reducing the supply of oxygen and passing steam through the bed of burning fuel into the clay to produce a reducing action on the mass through the action of the oxygen-deficient gases issuing from the fuel bed.

4. The process of forming a material for use in construction work which consists in firing a mass of argillaceous material to a temperature of approximately 800 degrees F., then in reducing the supply of air and passing steam through the bed of burning fuel and into the material until the temperature has reached approximately 1800 degrees F., and then admitting air to the kiln to cause an expansion of the clay and to convert the material into a porous vitrified mass.

5. The process of forming a clay product which consists in first firing a mass of clay in a kiln under oxidizing conditions, then in passing steam through the bed of burning fuel into the presence of the clay and continuing the firing of the clay in the atmosphere so produced.

6. The process of forming a material for use in making concrete which consists in firing clay in a reducing atmosphere and then in supplying oxygen to bring about an expansion of the clay to produce a porous structure therein.

7. The process of forming a clay product which consists in firing clay in an atmosphere produced by passing steam with an insufficient supply of air to produce complete combustion through the fuel bed and into the kiln.

8. The process of forming a clay product which consists in first firing a mass of clay in a kiln under oxidizing conditions, then in reducing the supply of air and passing an oxygen-deficient gas into the presence of the clay, and in gradually increasing the temperature of the kiln until a refractory vitrified condition of the material is produced.

Signed at New York, in the county of New York and State of New York, this 29 day of Oct., 1919.

BERNARD J. FALLON.